US009217802B2

(12) United States Patent
Muhl

(10) Patent No.: US 9,217,802 B2
(45) Date of Patent: Dec. 22, 2015

(54) SEISMIC IMAGE ENHANCEMENT

(75) Inventor: Saul Antonio Trujillo Muhl, Bogota (CO)

(73) Assignee: Schlumberger Technology Corporation, Sugar Land, TX (US)

(*) Notice: Subject to any disclaimer, the term of this patent is extended or adjusted under 35 U.S.C. 154(b) by 783 days.

(21) Appl. No.: 13/435,845

(22) Filed: Mar. 30, 2012

(65) Prior Publication Data
US 2012/0257476 A1 Oct. 11, 2012

Related U.S. Application Data

(60) Provisional application No. 61/472,084, filed on Apr. 5, 2011.

(51) Int. Cl.
G01V 1/28 (2006.01)
G01V 1/34 (2006.01)
G01V 1/32 (2006.01)
G01V 1/30 (2006.01)
G01V 1/36 (2006.01)

(52) U.S. Cl.
CPC .............. *G01V 1/325* (2013.01); *G01V 1/307* (2013.01); *G01V 1/366* (2013.01)

(58) Field of Classification Search
CPC ........ G01V 1/325; G01V 1/307; G01V 1/366
USPC ..................................... 367/38, 39
See application file for complete search history.

(56) References Cited

U.S. PATENT DOCUMENTS

| 3,882,446 | A | * | 5/1975 | Brittian et al. .................. 367/71 |
| 4,633,402 | A | * | 12/1986 | Flinchbaugh .................. 702/16 |
| 4,817,014 | A | * | 3/1989 | Schneider et al. ............ 708/422 |
| 5,940,778 | A | | 8/1999 | Marfurt et al. |
| 5,995,448 | A | * | 11/1999 | Krehbiel ......................... 367/70 |
| 5,995,449 | A | | 11/1999 | Green et al. |
| 6,151,555 | A | | 11/2000 | Van Bemmel et al. |
| 6,757,614 | B2 | | 6/2004 | Pepper et al. |
| 2003/0132934 | A1 | * | 7/2003 | Fremming .................... 345/419 |
| 2004/0098200 | A1 | * | 5/2004 | Wentland et al. ............... 702/2 |

OTHER PUBLICATIONS

Leonardo Azevedo Guerra Raposo Pereira, "Seismic Attributes in Hydrocarbon Reservoirs Characterization", Universidade de Aveiro, 2009, pp. 1, 53-60, 82-83, and 103-108 (17 pages).
Examination Report of Australian Application No. 2012201928 dated Jun. 1, 2014: pp. 1-4.

* cited by examiner

*Primary Examiner* — Daniel L Murphy
(74) *Attorney, Agent, or Firm* — Gary Gex

(57) ABSTRACT

A method can include accessing seismic data; providing a wave function that defines, at least in part, a correlation window length; generating local autocorrelation functions for the seismic data using the correlation window length; performing cross-correlations between the wave function and each of the local autocorrelation functions to provide local cross-correlation coefficient values; determining second derivatives of the local cross-correlation coefficient values to provide local second derivative values; and rendering the local second derivative values to a display. Various other apparatuses, systems, methods, etc., are also disclosed.

20 Claims, 14 Drawing Sheets
(3 of 14 Drawing Sheet(s) Filed in Color)

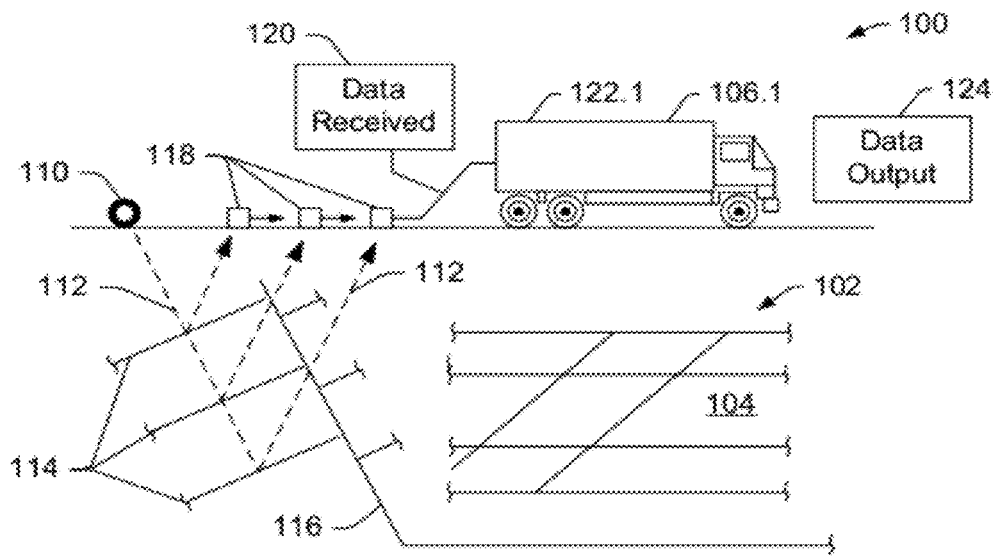
Fig. 1.1
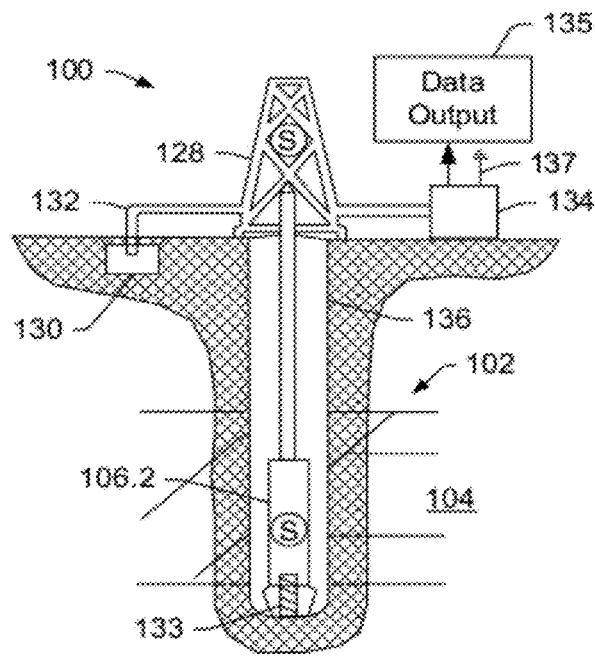
Fig. 1.2

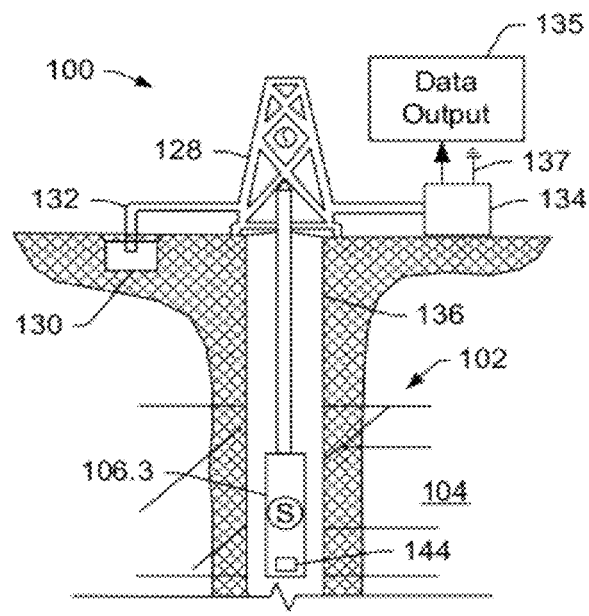
Fig. 1.3
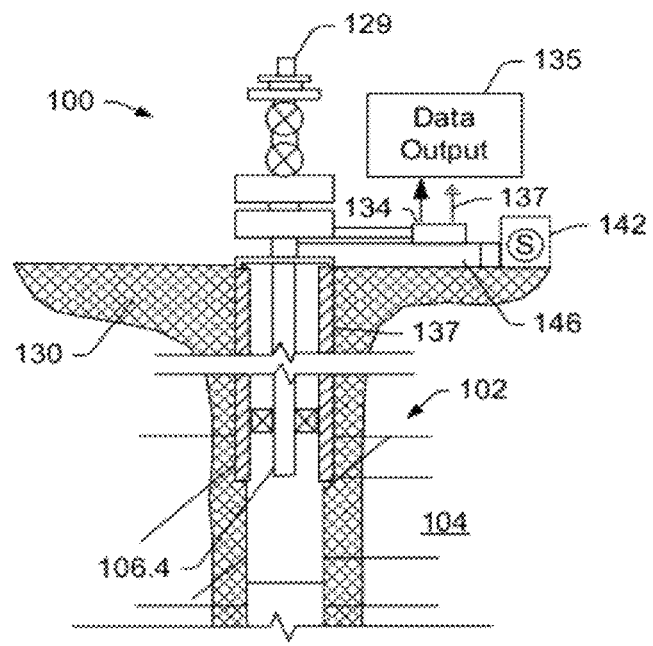
Fig. 1.4

First Derivative
710

$$\frac{df(t)}{dt} = \frac{[f(t-2) - f(t+2)]}{12} - \frac{8[f(t-1) - f(t+1)]}{12}$$

Second Derivative
720

$$\frac{d^2 f(t)}{dt^2} = f(t-1) + f(t+1) - 2f(t)$$

0.4 + 0.7 − 1.2 = − 0.1

SEISMIC IMAGE ENHANCEMENT

RELATED APPLICATIONS

This application claims the benefit of U.S. Provisional Application having Ser. No. 61/472,084 entitled "Method, System, Apparatus and Computer Readable Medium for Seismic Image Enhancement," filed Apr. 5, 2011, which is incorporated by reference herein.

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data (e.g., for identifying structures in a geologic environment).

SUMMARY

A method can include generating local autocorrelation functions for seismic data and performing cross-correlations between each of the local autocorrelation functions with a wave function to provide cross-correlation coefficient values where second derivative values are determined for the cross-correlation coefficient values. The resulting second derivative values may be rendered to a display for purposes of analysis.

One or more computer-readable media may include computer-executable instructions to generate local autocorrelation functions for seismic data, perform cross-correlations between the wave function and each of the local autocorrelation functions to provide local cross-correlation coefficient values and to determine second derivatives of the local cross-correlation coefficient values to provide local second derivative values.

A system may include one or more processors; memory; a network interface; a display interface; and processor-executable instructions stored in the memory to receive seismic data via the network interface, generate local autocorrelation functions for the seismic data (e.g., using a correlation window length), perform cross-correlations between a wave function and each of the local autocorrelation functions to provide local cross-correlation coefficient values, determine second derivatives of the local cross-correlation coefficient values to provide local second derivative values, and transmit signals via the display interface to render the local second derivative values to a display. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of the described implementations can be more readily understood by reference to the following description taken in conjunction with the accompanying drawings.

FIGS. 1.1 to 1.4 illustrate simplified, schematic views of an example of an oilfield;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, seismic image enhance (SIE) may be performed using seismic to simulation software. For example, the PETREL® seismic to simulation software framework (Schlumberger Limited, Houston, Tex.) includes various features to perform SIE (e.g., with respect to a 3D seismic cube, a 2D seismic line, etc.). As an example, it may not be necessary to re-process seismic data prior to performing SIE. For example, it may only be necessary to know the dominant frequency of seismic data which will be duplicated and used with an iso-frequency component attribute (e.g., as an input parameter).

In the PETREL® framework, a user may apply the iso-frequency component attribute to seismic data and the parameters to obtain a value of a dominant frequency doubled in the seismic data. Such a process may provide processed seismic data in a "frequency domain" where, to return the processed seismic data to an "amplitude domain", a second derivative attribute may be applied. As an example, application of an iso-frequency component attribute followed by application of a second derivative attribute may provide a user with more data frequency content, which may, in turn, allow a user to identify more stratigraphic and structural features represented by the seismic data.

Figure 9:
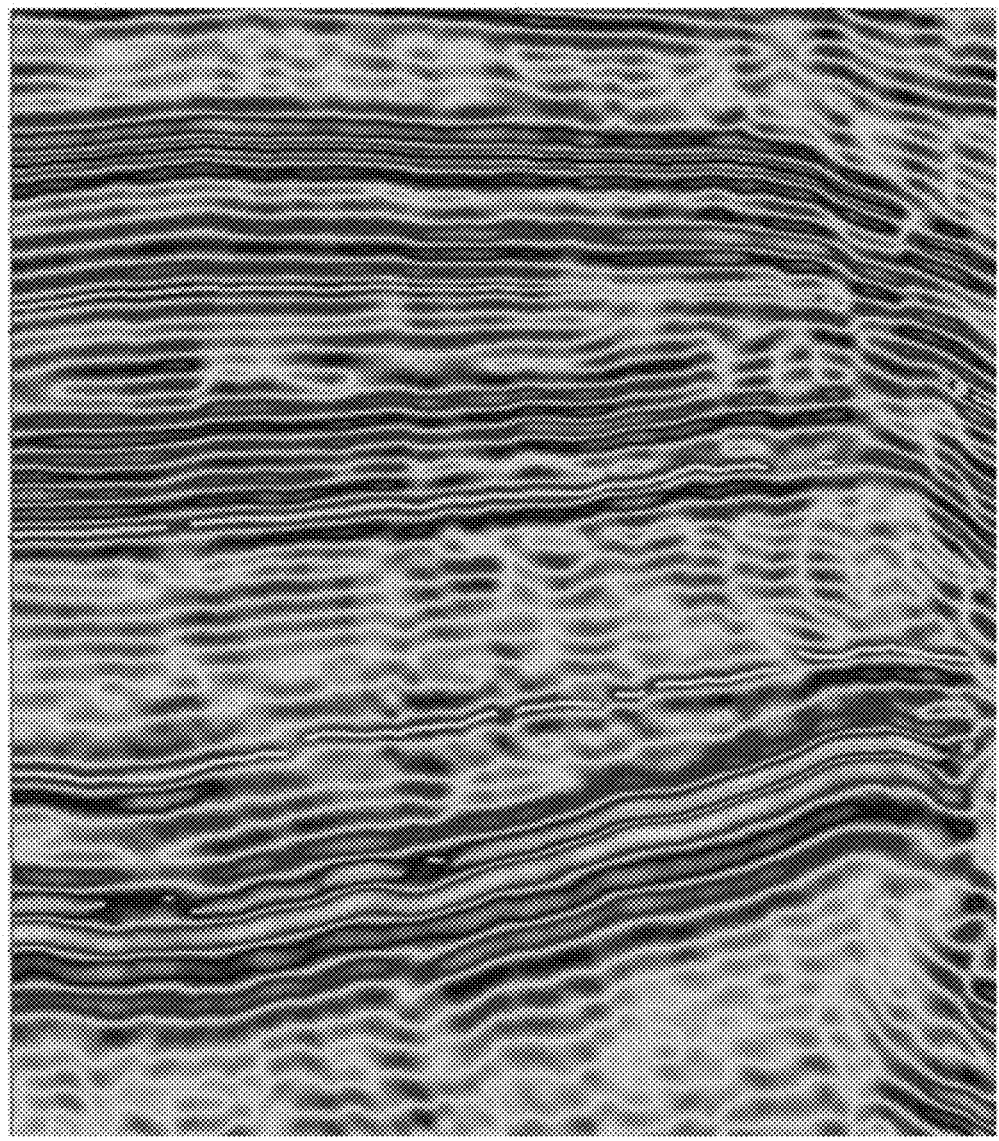
FIG. 9 illustrates, in color, an example of seismic data.

As an example, consider 2D seismic data provided as amplitude versus time/depth and position (see, e.g., FIG. 9). In such an example, an iso-frequency component attribute may be applied locally to the 2D seismic data using a selected frequency and cycle length where the frequency and the cycle length determine a "correlation window length" (e.g., in units of time) where the "correlation window" is applied locally. As to the selected frequency, the value may be selected, for example, depending on the average frequency content of the seismic data under consideration. The iso-frequency component attribute may perform autocorrelation locally on the 2D seismic data (e.g., using the correlation window length) to generate local autocorrelation functions with respect to time/depth and position and then perform cross-correlation for the selected frequency, for example, using a wave function (e.g., a cosine function) applied locally to generate local values for cross-correlation coefficients (see, e.g., FIG. 10). Given the local values for cross-correlation coefficients, a second derivative operation may be applied to provide values for the second derivative of the cross-correlation values (e.g., time/depth versus position) where the second derivative is taken with respect to time/depth (see, e.g., FIG. 11). In such an example, the second derivative of the cross-correlation values can yield an attribute that can be thought of (e.g., and viewed) as an amplitude rather than a frequency (e.g., or a frequency correlation value). Thus, as an example, by taking the second derivative of the correlation coefficient values, seismic data may be enhanced (e.g., whether 2D or 3D seismic data).

As an example, a process may be applied to 3D seismic data, optionally to provide a horizontal slice, a vertical slice or other slice through the 3D seismic data where features are enhanced by applying autocorrelation, cross-correlation and second derivative operations (e.g., optionally successive first derivative operations).

In various examples, a method can include applying a second derivative operation to cross-correlation coefficient values, for example, to improve frequency content of seismic data, which may allow a seismic interpreter to visualize features otherwise difficult to discern.

As an example, an iso-frequency component attribute may be applied to seismic data. The iso-frequency component attribute may represent a cross-correlation function of autocorrelation of seismic data and a kernel function. As an example, a kernel function may be a wave function such as a cosine function. Where a cosine function is provided, the cross-correlation may be referred to as the "correlation cosine transform" or "cosine-correlation transform" (CCT) technique. The CCT technique may result in a "frequency" value as a measure of a contribution of a frequency (e.g., optionally defined by a user). An intermediate result of a method that includes application of a cross-correlation technique may include data showing a cross-correlation coefficient of similarity between autocorrelations of seismic data and a kernel function.

Another attribute, referred to as a "second derivative attribute" may be applied to seismic data related to the iso-frequency component attribute output. Upon application of a second derivative operation, seismic data may return, effectively, to the domain of amplitude. As a result, a seismic interpreter may be able to identify certain stratigraphic and structural features represented by the seismic data. For time-sampled seismic data, a second derivative may be approximated using a discretized approximate form.

Figure 10:
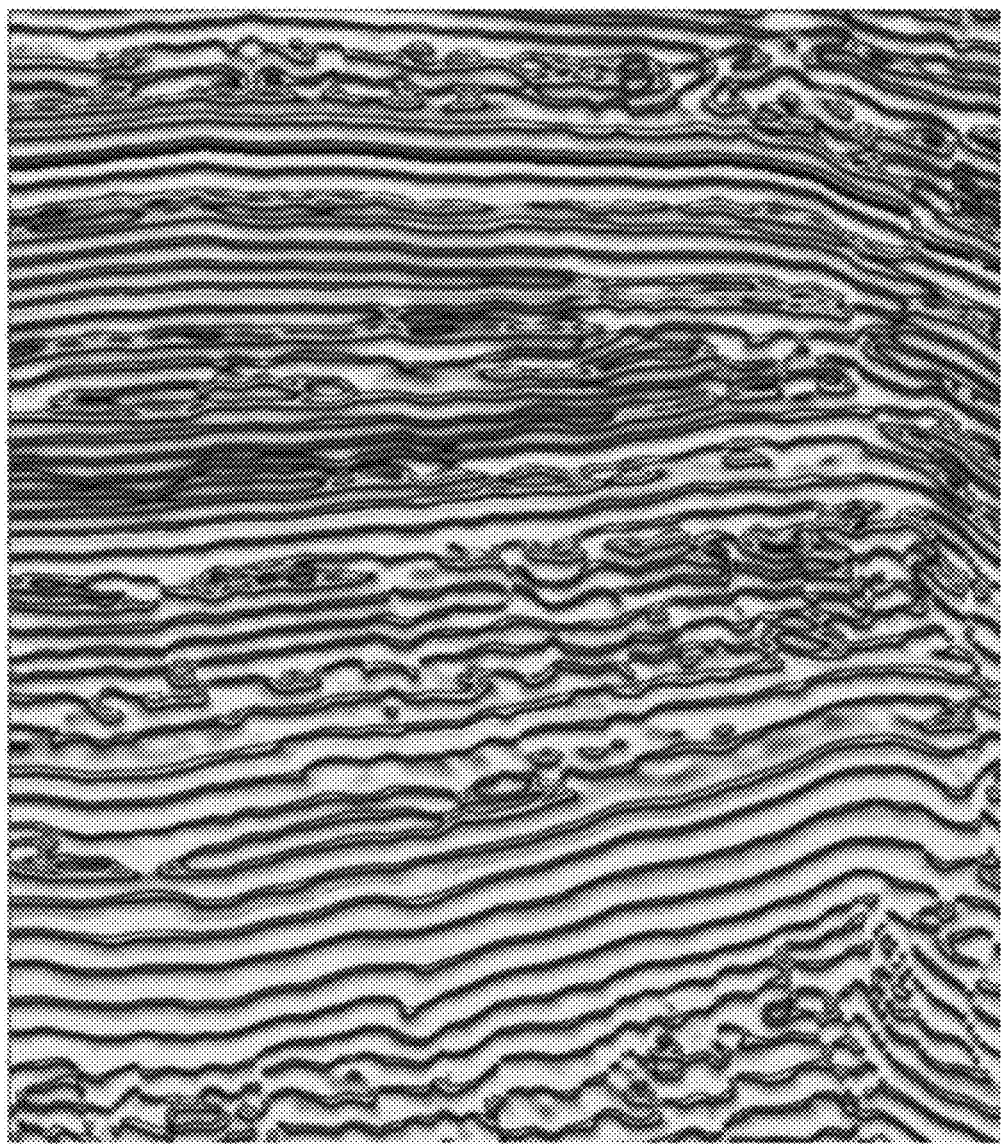
FIG. 10 illustrates, in color, an example of cross-correlation coefficient values.
Figure 11:
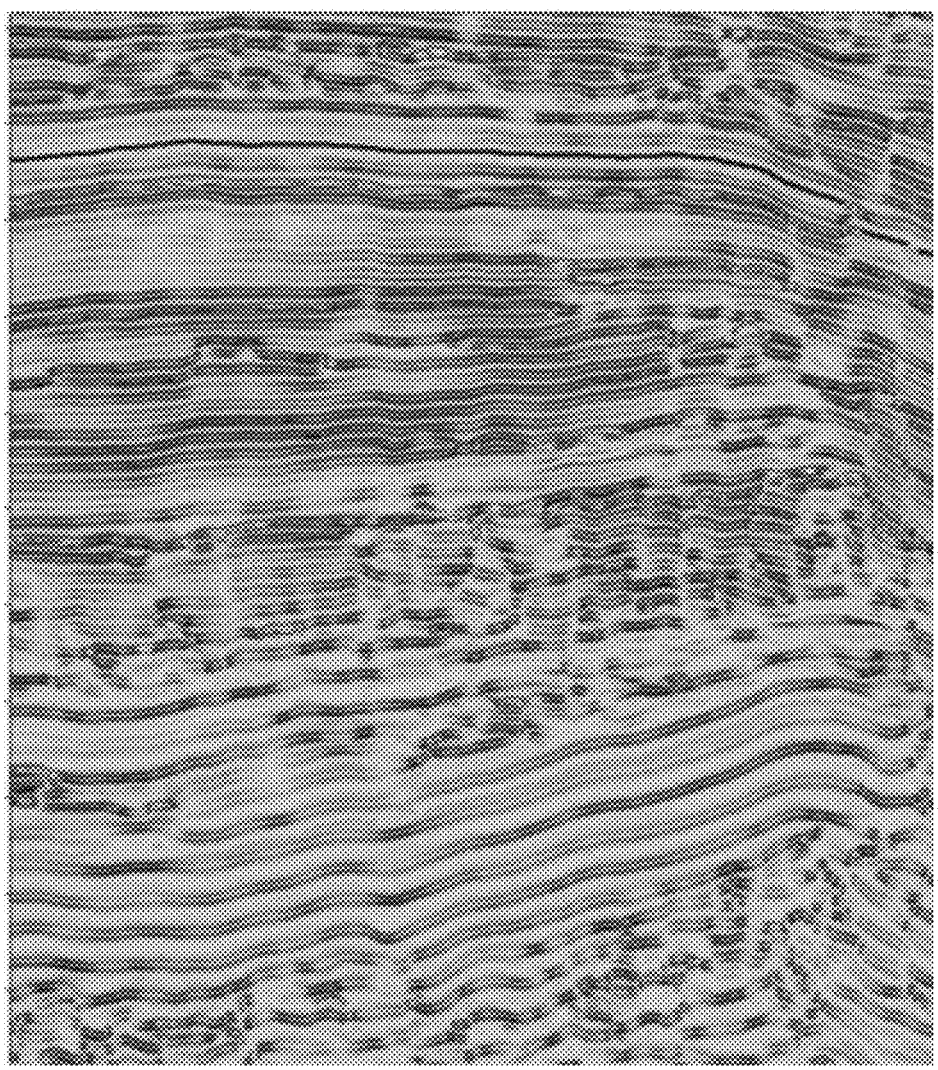
FIG. 11 illustrates, in color, an example of second derivative values of the cross-correlation coefficient values of FIG. 10.

As an example, a workflow may include input of seismic data (see e.g., FIG. 9), applying an iso-frequency component operation (see e.g., FIG. 10), and applying a second derivative operation for output of a seismic enhanced image (SIE) (see e.g., FIG. 11).

As an example, a method for performing SIE may include providing input, where the input includes a predetermined volume containing one or more structural and stratigraphic features. The input may further include a plurality of 2D or 3D seismic traces that include a plurality of reflectivity features including frequency content acquisition, without a predetermined specific processing. In such an example, the plurality of seismic traces may represent elastic characteristics of a geological feature. A method may further include applying a spectral decomposition, thereby producing a second plurality of seismic traces containing a plurality of autocorrelation functions with a dynamic range, for example, between 1 and −1. The method may also include applying a differential equation to the second plurality of seismic traces, thereby producing a third plurality of seismic traces that include a second plurality of reflectivity features. The third plurality of seismic traces may represent one or more stratigraphic and structural features that may be interpreted using a seismic interpreter.

As an example, a method can perform seismic image enhancement (SIE) using a first pass that converts seismic data in an amplitude domain to a frequency domain (e.g., using an iso-frequency component operation). Such a first pass may be a "seismic decomposition" operation (see, e.g., U.S. Pat. No. 6,757,614, which is incorporated by reference herein). A second pass operation, for example, related to a 3D seismic cube or a 2D seismic line in the frequency domain may be applied in the form of a second derivative operation. Such a second pass operation may convert information in the frequency domain, effectively, to the domain of amplitude (e.g., with higher frequency content).

FIGS. 1.1 through 1.4 illustrate simplified, schematic views of an example of an oilfield 100 that includes a subterranean formation 102 with a reservoir 104 therein in accordance with implementations of various examples of technologies and examples of techniques described herein. FIG. 1.1 illustrates an example of a survey operation being performed by a survey tool, such as a seismic truck 106.1, to measure properties of the subterranean formation where, for example, the survey operation is a seismic survey operation for producing sound vibrations. In FIG. 1.1, one such sound vibration, a sound vibration 112 generated by a source 110, reflects off horizons 114 in an earth formation 116. A set of sound vibrations is received by sensors, such as geophone-receivers 118, situated on the earth's surface. The data received 120 is provided as input data to, for example, a computer 122.1 of a seismic truck 106.1, and responsive to the input data, the computer 122.1 generates seismic data output 124. This seismic data output may be stored, transmitted or further processed as desired, for example, by data reduction.

FIG. 1.2 illustrates an example of a drilling operation being performed by drilling tools 106.2 suspended by a rig 128 and advanced into the subterranean formation 102 to form a wellbore 136. In the example of FIG. 1.2, a mud pit 130 is used to draw drilling mud into the drilling tools via a flow line 132 for circulating drilling mud down through the drilling tools, then up the wellbore 136 and back to the surface. The drilling tools are advanced into the subterranean formation 102 to reach the reservoir 104. Each well may target one or more reservoirs. The drilling tools may be adapted for measuring downhole properties (e.g., using logging while drilling). Such logging while drilling tools may also be adapted for taking a core sample 133 as shown.

Computer facilities may be positioned at various locations about the oilfield 100 (see, e.g., the surface unit 134) and/or at remote locations. The surface unit 134 may be used to communicate with the drilling tools and/or offsite operations, as well as with other surface or downhole sensors. The surface unit 134 may be capable of communicating with the drilling tools to send commands to the drilling tools, and to receive data therefrom. The surface unit 134 may also collect data generated during the drilling operation and produce data output 135, which may then be stored, transmitted, etc.

Sensors (S), such as gauges, may be positioned about the oilfield 100 to collect data relating to various oilfield operations as described previously. As shown in the example of FIG. 1.2, a sensor (S) may be positioned in one or more locations in the drilling tools and/or at the rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

The drilling tools 106.2 may include a bottom hole assembly (BHA) (not shown), generally referenced, near the drill bit (e.g., within several drill collar lengths from the drill bit). The bottom hole assembly can include capabilities for measuring, processing, and storing information, as well as communicating with the surface unit 134. The bottom hole assembly further includes drill collars for performing various other measurement functions.

The bottom hole assembly may include a communication subassembly that communicates with the surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed; the subsurface conditions may change. The earth model may also need adjustment as new information is collected.

The data gathered by sensors (S) may be collected by the surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

The surface unit 134 may include a transceiver 137 to allow communications between the surface unit 134 and various portions of the oilfield 100 or other locations. The surface unit 134 may also be provided with or functionally connected to one or more controllers (not shown) for actuating mechanisms at the oilfield 100. The surface unit 134 may then send command signals to the oilfield 100 in response to data received. The surface unit 134 may receive commands via the transceiver 137 or may itself execute commands to the controller. A processor may be provided to analyze the data (locally or remotely), make the decisions and/or actuate the controller. In this manner, the oilfield 100 may be selectively adjusted based on the data collected. Such a technique may be used to optimize portions of the field operation, such as controlling drilling, weight on bit, pump rates, or other parameters. Such adjustments may be made, for example, automatically based on computer protocol, and/or manually by an operator. In some cases, well plans may be adjusted to select optimum operating conditions, or to avoid problems.

FIG. 1.3 illustrates an example of a wireline operation being performed by a wireline tool 106.3 suspended by the rig 128 and into the wellbore 136. The wireline tool 106.3 may be adapted for deployment into the wellbore 136 for generating well logs, performing downhole tests and/or collecting samples. The wireline tool 106.3 may optionally help to perform one or more other operations, for example, placement of an explosive, radioactive, electrical, or acoustic energy source 144 that sends and/or receives electrical signals to surrounding the subterranean formation 102 (e.g., and fluids therein).

The wireline tool 106.3 may be operatively connected to, for example, the geophones 118 and the computer 122.1 of the seismic truck 106.1. The wireline tool 106.3 may also provide data to the surface unit 134. The surface unit 134 may collect data generated during the wireline operation and may produce the data output 135 that may be stored, transmitted, etc. The wireline tool 106.3 may be positioned at various depths in the wellbore 136 to provide a survey or other information relating to the subterranean formation 102.

Sensors (S), such as gauges, may be positioned about the oilfield 100 to collect data relating to various field operations as described previously. As shown, sensor S is positioned in the wireline tool 106.3 to measure downhole parameters which relate to, for example porosity, permeability, fluid composition and/or other parameters of the field operation.

FIG. 1.4 illustrates an example of a production operation being performed by a production tool 106.4 deployed from a production unit or a Christmas tree 129 and into a completed wellbore 137 for drawing fluid from the downhole reservoirs into surface facilities 142. The fluid flows from the reservoir 104 through perforations in the casing (not shown) and into the production tool 106.4 in the completed wellbore 137 and to the surface facilities 142 via a gathering network 146.

Sensors (S), such as gauges, may be positioned about the oilfield 100 to collect data relating to various field operations as described previously. As shown, the sensor (S) may be positioned in the production tool 106.4 or associated equipment, such as the Christmas tree 129, the gathering network 146, the surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While the examples of FIGS. 1.2 through 1.4 illustrate some tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of the examples of FIGS. 1.1 through 1.4 are intended to provide a brief description of an example of a field usable with oilfield application frameworks. Part, or all, of the oilfield 100 may be on land, water, and/or sea. Also, while a single field measured at a single location is depicted, oilfield applications may be utilized with any combination of one or more oilfields, one or more processing facilities and one or more wellsites.

Figure 2:
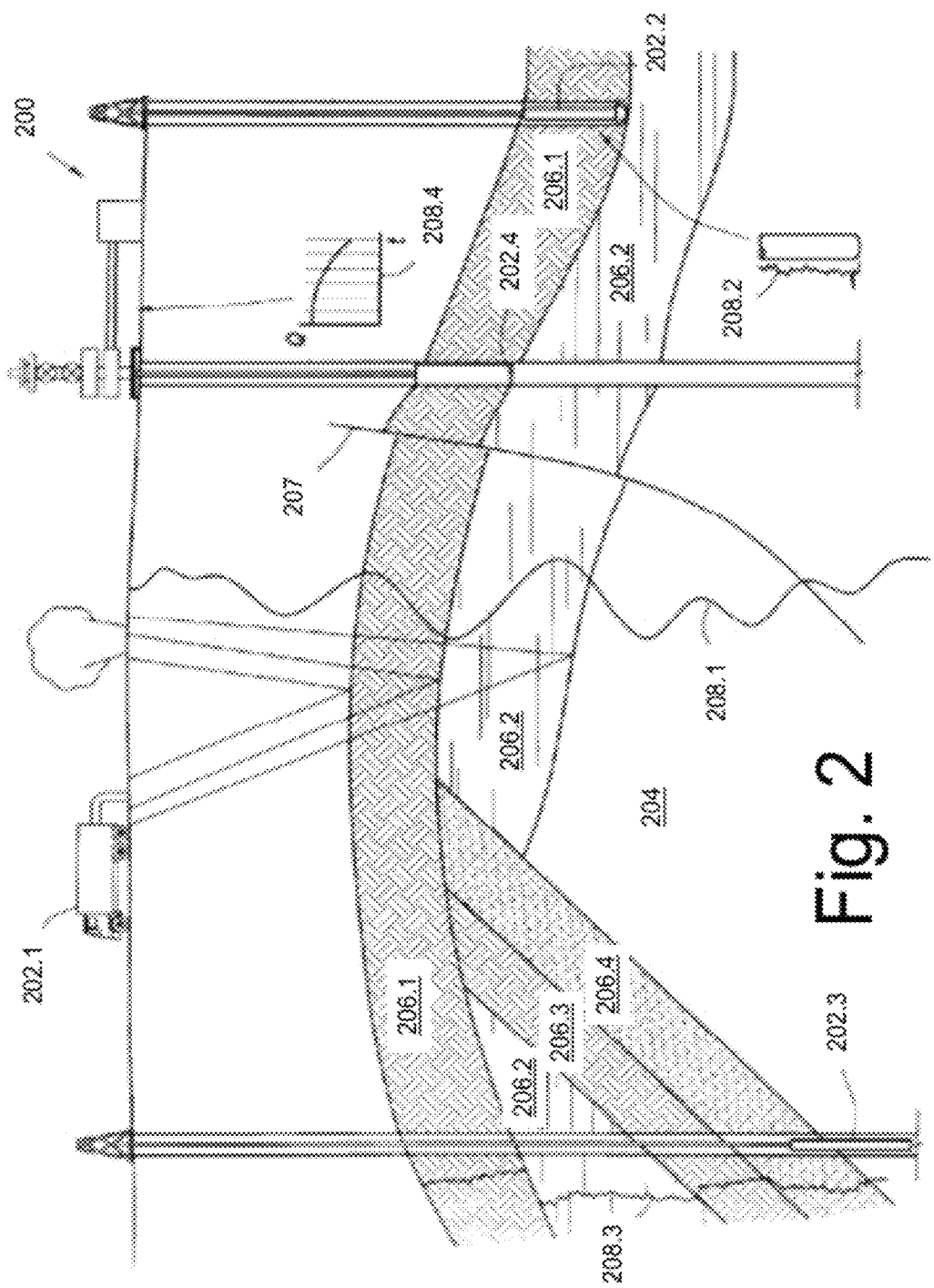
FIG. 2 illustrates a schematic view, partially in cross section of an example of an oilfield.

FIG. 2 shows a schematic view, partially in cross section of an example of an oilfield 200 having data acquisition tools 202.1, 202.2, 202.3 and 202.4 positioned at various locations along the oilfield 200 for collecting data of a subterranean formation 204. The data acquisition tools 202.1, 202.2, 203.3 and 202.4 may be, for example, provided as the data acquisition tools 106.1, 106.2, 106.3 and 106.4 of the examples of FIGS. 1.1 through 1.4, respectively, or others not depicted. As shown in the example of FIG. 2, the data acquisition tools 202.1, 202.2, 202.3 and 202.4 can generate data plots or measurements 208.1, 208.2, 208.3, 208.4, 202.1, 202.2, 202.3 and 202.4, respectively. Such data plots are depicted along the oilfield 200 as examples to demonstrate data generated by various operations.

In FIG. 2, the data plots 208.1, 208.2, and 208.3 are examples of static data plots that may be generated by the data acquisition tools 202.1, 202.2, 202.3 and 202.4, respectively. The static data plot 208.1 is an example of a seismic two-way response time (TWT). The static plot 208.2 is an example of a core sample data measured from a core sample of the formation 204. The static data plot 208.3 is an example of a logging trace. A production decline curve or graph 208.4 is an example of a dynamic data plot of the fluid flow rate over time. Other data may also be collected, such as historical data, user inputs, economic information and/or other measurement data and other parameters of interest.

In FIG. 2, the subterranean structure 204 has a plurality of geological formations or layers. As shown, the several formations or layers include a shale layer 206.1, a carbonate layer 206.2, a shale layer 206.3, and a sand layer 206.4. A fault 207 extends through the layers 206.1 and 206.2. The static data acquisition tools may be adapted to take measurements and detect characteristics of the formations.

While a specific subterranean formation with specific geological structures is depicted in FIG. 2, it will be appreciated that the oilfield 200 may contain a variety of geological structures and/or formations. In some locations, typically below the water line, fluid may occupy pore spaces of the formations. Each of the measurement devices may be used to measure properties of the formations and/or its geological features. While each acquisition tool is shown as being in specific locations in the oilfield 200, it will be appreciated that one or more types of measurement may be taken at one or more location across one or more oilfields or other locations for comparison and/or analysis.

Data collected from various sources, such as the data acquisition tools of FIG. 2, may be processed and/or evaluated. As an example, seismic data displayed in the static data plot 208.1 from the data acquisition tool 202.1 may be analyzed by a geophysicist to determine characteristics of the subterranean formations and features. As an example, core data shown in the static plot 208.2 and/or log data from the well log 208.3 may be analyzed by a geologist to determine various characteristics of the subterranean formation. As an example, production data from the graph 208.4 may be analyzed by a reservoir engineer to determine fluid flow reservoir characteristics. Data analyzed by a geologist, geophysicist, a reservoir engineer, etc., may optionally be analyzed using one or more modeling techniques.

Figure 3:
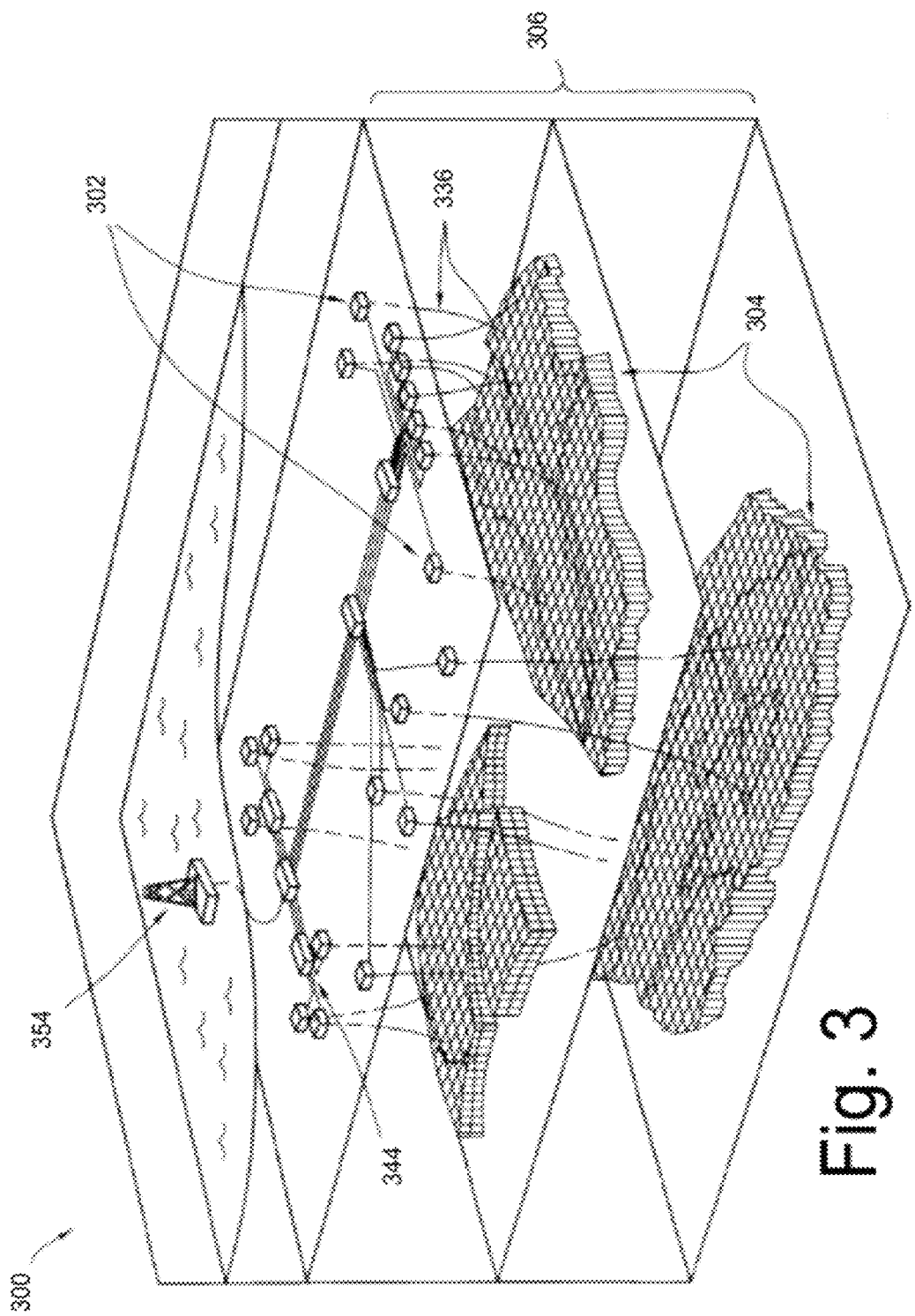
FIG. 3 illustrates a schematic view of an example of a production system for performing one or more oilfield operations.

FIG. 3 shows an example of an oilfield 300 for performing production operations. As shown, the oilfield 300 includes a plurality of wellsites 302 operatively connected to a processing facility 354. Part, or all, of the oilfield 300 may be on land and/or sea. Also, while a single oilfield with a single processing facility and a plurality of wellsites is depicted any combination of one or more oilfields, one or more processing facilities and one or more wellsites may be present.

In the example of FIG. 3, each of the one or more wellsites 302 includes equipment that forms a respective wellbore 336 into the earth. Each of the wellbores 336 extends through a subterranean formation 306, which includes various layers and reservoirs 304. Such reservoirs may contain fluids, such as hydrocarbons (e.g., in one or more phases). In the example of FIG. 3, each of the wellsites 302 may draw fluid from one or more of the reservoirs 304 and pass such fluid or fluids to the processing facility 354, for example, via one or more surface networks 344. As an example, each of the surface networks 344 can include tubing and control mechanisms for controlling the flow of fluids from one or more wellsites 302 to the processing facility 354.

Given the various examples of FIGS. 1.1, 1.2, 1.3, 1.4, 2 and 3, various aspects of seismic data (e.g., reflection data) are described along with processing of such data, for example, to enhance data for identification of one or more features.

Seismic reflection data includes information about subsurface geology, physical rock properties, etc. Features may be inferred from reflected wave travel-time between source and arrival at one or more receivers. As an example, a two-way travel-time (TWT) may be defined by the time taken for a seismic wave to travel from a source to a boundary (e.g., between layers with a different seismic velocity, density, and acoustic impedance) where reflected energy returns to a receiver. A contrast between acoustic impedance may be referred to as a reflection coefficient, which may represent an interface (e.g., a boundary). Arrival of reflected seismic waves can produce systematic variations from trace to trace. Such variations may be referred to as seismic events, possibly interpreted as real geological interfaces between layers with different reflection coefficients. Measuring travel-time of seismic events can allow for determination of attitude and location of the geological interfaces. An interpretation process may take into account amplitude, frequency, phase, wave shape variations, etc.

Three-dimensional seismic data acquisition can provide a cube of seismic data relative to a three-dimensional coordinate system, for example, X, Y and depth Z, which may be time. Three-dimensional seismic data may be organized in inlines (e.g., according to an acquisition direction) and crosslines (e.g., in a direction perpendicular to an acquisition direction). Three-dimensional seismic data may allow for mapping horizons and following of seismic events along at least a portion of an acquisition survey area. Such interpretations may facilitate building of a geological model (e.g., optionally a reservoir model).

In three-dimensional seismic data, an individual seismic trace may be considered to be a seismic wavelet convolution resulting from travel of seismic energy emitted by a source through a subsurface where the seismic wavelet convolution includes reflection coefficients (e.g., in series) derived from properties of the subsurface (e.g., density and seismic velocity of different rock layers crossed by seismic energy emitted by the source).

Various types of processing may be applied to seismic data, for example, consider correction, filtering, deconvolution, etc. A deconvolution process may aim to compress wavelet shape, recover high-frequencies, attenuate reverberations and short-period multiples, for example, to increase vertical (depth) resolution of reflectors and to normalize the frequency spectrum of the seismic data being processed. A deconvolution process may uncover one or more reflection coefficients, for example, to form a series of reflection coefficients. As to corrections, as an example, a Normal Moveout (NMO) Correction may be applied (e.g., to remove effects of source-receiver offset and even out TWT). After some processing, seismic traces may be "stacked" (e.g., by positioning seismic reflections to their "true" subsurface depth or depths). Various processing techniques may be applied to seismic data pre-stack or post-stack.

After one or more processing techniques have been applied to seismic data, interpretations may be made using processed seismic data; noting that an interpretation process may include applying one or more additional processing techniques. As an example, an additional processing technique may aim to enhance processed seismic data and be referred to as a seismic image enhancement (SIE) technique. An SIE technique may facilitate recognition of one or more seismic patterns (e.g., features) germane to potential hydrocarbon accumulations sites, depositional environments, structural geology, etc.

An interpretation process may involve visual display of seismic data and interaction using one or more tools (e.g., executable instruction modules stored in memory and executed by one or more processors). An interpretation process may consider vertical seismic sections, inline and crossline directions, horizontal seismic sections called horizontal time slices, etc. Seismic data may optionally be interpreted with other data such as well log data. An interpretation process may include associating seismic reflectors to boundaries of known lithological layers. Features such as faults and seismic reflectors (e.g., horizons) may be interpreted, for example, in a travel-time domain, in an amplitude domain (e.g., as to amplitude content). An interpretation process may include identifying, reducing, etc., a number of mis-ties (e.g., mismatches between seismic data and well log data, crossing of seismic lines and mismatch of seismic reflectors, etc.).

An interpretation process may include loading seismic data (e.g., from a data store optionally via a network connection). Seismic data may be formatted according to the SEG-Y format standard (Society of Exploration Geophysicists), the ZGY format standard (e.g., a bricked format) or another format. Seismic data may optionally be loaded, for example, according to a number of traces.

An interpretation process may include determining one or more seismic attributes. A seismic attribute may be considered, for example, a way to describe, quantify, etc., characteristic content of seismic data. As an example, a quantified characteristic may be computed, measured, etc., from seismic data. A seismic attribute may be a rate of change of a quantity (or quantities) with respect to time, space or both time and space. As an example, a seismic attribute may provide for examination of seismic data in an amplitude domain, in a time domain, or in another manner.

An interpretation framework may include modules to determine one or more seismic attributes. Seismic attributes may optionally be classified, for example, as volume attributes or surface attributes. As an example, a volume attribute may be an attribute computed from a seismic cube and may result in a new seismic cube that includes information pertaining to the volume attribute. As an example, a surface attribute may be a value associated with a surface of a seismic cube that includes information pertaining to a volume attribute.

Seismic attributes may be derived from seismic wavelet components. As an example, amplitude content in seismic data may provide for determining one or more physical characteristics about a subsurface (e.g., acoustic impedance, reflection coefficients, velocities, absorption effects). As an example, phase content in seismic data may provide for determination of shape and geometry of reflectors (e.g., for interpretation of seismic stratigraphy and depositional regimes). As an example, frequency content in seismic data may provide for determination of stratigraphic events, fault interpretation due to absorption effects, forecast of reservoir properties, interpretation of additional geologic layering (e.g., combine with amplitude content), etc.

A seismic interpretation may be performed using displayable information. For example, information may be rendered to a display device, a projection device, a printing device, etc. As an example, one or more color schemes may be referenced for displayable information, for example, to enhance visual examination of displayable information. As an example, a color scheme may include a palette, a range, etc. A look-up-table (LUT) or other data structure, function (e.g., linear or non-linear), etc., may allow for mapping of values associated with one or more seismic attributes to colors (e.g., RGB, YCbCr, etc.). Where the human eye will be used or is used for viewing displayable information, a color scheme may be selected to enhance interpretation (e.g., distinguishing features of displayable information).

A module for determining one or more seismic attributes may include one or more parameters. As an example, a module may include one or more parameters that may be set via a graphic user interface, a specification file, etc. In such an example, an interpreter may wish to examine a seismic attribute for seismic data using one or more values of a parameter. As an example, such a module may provide a default value and a field, graphical control, etc., that allows for input of a value.

One or more seismic attributes may pertain to seismic signal processing of seismic data. Such processing may act on frequency, amplitude or other aspects of seismic data. As an example, seismic signal processing may operate on a seismic trace, which may be provided in an amplitude domain. In an amplitude domain, a seismic trace may be represented as a function with respect to time (e.g., f(t)). For example, in a two-dimensional plot, the abscissa may correspond to time and the ordinate may correspond to amplitude.

For a seismic trace in an amplitude domain represented by f(t), a first derivative with respect to time may be represented by df(t)/dt or in a discretized form for a digitized seismic trace by:

$$\frac{df(t)}{dt} = \frac{[f(t-2) - f(t+2)]}{12} - \frac{8[f(t-1) - f(t+1)]}{12}$$

A first derivative seismic attribute may include the foregoing equation (e.g., or other approximation equation) and be applied to one or more seismic traces. Such an attribute may be considered as phase shifting by 90° the one or more seismic traces. Such an attribute may provide information germane to quality of signal consistency (e.g., positive or negative peaks may produce zero crossings) and improve correlation between seismic data and lithology-indicative well log data.

Where acquired seismic data has been processed to provide approximately zero-phase seismic data, a comparison may be made between such data and first derivative seismic attribute information (e.g., 90° phase shifted). A visual comparison may provide for observation of increased vertical resolution and sharpness of seismic reflectors, which, for example, may facilitate thin-bed interpretation. A first derivate seismic attribute volumes (e.g., calculated from zero-phase seismic data), may enhance interpretability and, for example, may be used as seismic conditioning for a picking tool for seismic reflector interpretation.

For a seismic trace in an amplitude domain represented by f(t), a second derivative with respect to time may be represented by $d^2f(t)/dt^2$ or in a discretized form for a digitized seismic trace by:

$$\frac{d^2 f(t)}{dt^2} = f(t-1) + f(t+1) - 2f(t)$$

As an example, a second derivative seismic attribute may be implemented in one or more manners. For example, consider applying a first derivative seismic attribute twice to provide two 90° phase shifts for a total phase shift of 180°. A phase shift of 180° can provide a second derivative seismic attribute that includes traces of inverted polarity such that peaks become troughs and troughs become peaks.

As to frequency, a dominant frequency seismic attribute may be provided. As an example, a dominant frequency seismic attribute may leverage one or more other seismic attributes. For example, where an instantaneous frequency seismic attribute and an instantaneous bandwidth attribute are provided, a dominant frequency seismic attribute may sum a square of instantaneous frequency with the square of instantaneous bandwidth and determine a square root of the sum to represent a root mean square (RMS) frequency of the amplitude spectrum.

A seismic attribute may pertain to stratigraphic features in seismic data and, for example, facilitate identification of stratigraphic sequences, lateral and vertical variations of lithologies, structural orientation measurements, frequency decomposition, facies distribution, etc.

As an example, consider an iso-frequency seismic attribute. Such an attribute may include use of an iso-frequency component to generate a volume attribute through a seismic decomposition technique.

As to a seismic decomposition technique, consider as an example a spectral decomposition performed locally that includes generating an autocorrelation function of seismic data on a time window. In such an example, the autocorrelation function tends to be insensitive to phase content of the seismic data, thus aligning the seismic energy at zero lag. A subsequent process can include performing a cross-correlation between a wave function such as a cosine wave function (correlation-cosine transform "CCT", e.g., with a defined number of cycles) and the generated autocorrelation function where the cross-correlation determines numeric similarity of the autocorrelation function and the wave function.

As an example, a cross-correlation algorithm may include an equation such as:

$$\phi_{GH}(\tau) = \frac{\sum_{k=-N}^{N} G(k)H(k+\tau)}{\left[\sum_{k=-N}^{N}\left[G^2(k)\sum_{k=-N}^{N}H^2(k)\right]\right]^{0.5}}$$

In the above equation, G(k) and H(k) are signals being correlated, for example, they may be windowed seismic data to generate an autocorrelation function or a cosine function and a generated autocorrelation function.

Output of a CCT technique may provide a correlation coefficient that measures the correlation between a known cosine wave signature of a specific frequency and the autocorrelation seismic data. An iso-frequency seismic attribute three-dimensional cube may be scaled, for example, between −1 to 1 where 0 indicates an uncorrelated function, where 1 indicates identical signals and where −1 indicates identical signals but inverted.

As to parameters, a cosine frequency parameter and a number of cycles parameter may be provided. Such parameters may define a correlation window length for extraction of the iso-frequency seismic attribute. For example, a correlation window length may depend on a relative frequency of a cosine function and a frequency content of seismic data. While a cosine function is mentioned (e.g., or cosine wave function), one or more other types of functions may be used, for example, one or more other types of wave functions. In a cross-correlation process, a function may be a kernel function.

As to windowed seismic data, a short window tends to avoid focusing of correlation energy, for example, to facilitate identification of anomalies. As to a long window, it may facilitate identification of local geologic effects (e.g., and not tuning effects).

As an example, a module may provide an option to perform spectral normalization, for example, a spectral whitening that may act to remove a signature of a seismic wavelet (e.g., as associated with a seismic energy source).

As an example, an iso-frequency seismic attribute may be applied to seismic data, for example, to reveal subtle variations in lithology (e.g., which may indicate stratigraphic traps for hydrocarbons, etc.).

Figure 4:
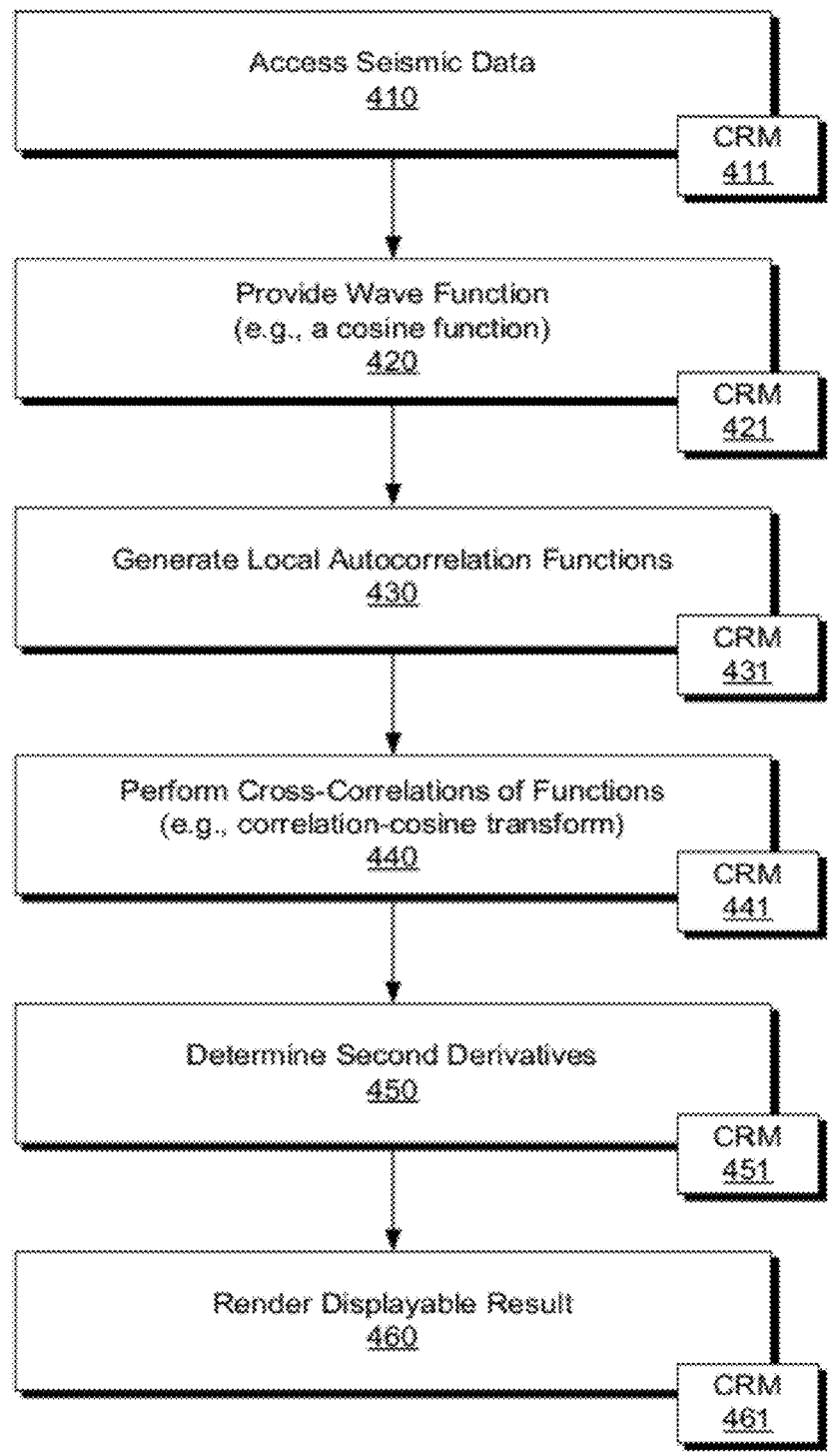
FIG. 4 illustrates an example of a method.

FIG. 4 shows an example of a method 400 that can enhance a seismic image, for example, to facilitate analysis, identification of features, etc. In the example of FIG. 4, the method 400 includes an access block 410 for accessing seismic data, a provision block 420 for providing a wave function (e.g., a cosine function) specified in terms of a frequency and a cycle length to a determine a correlation window length (e.g., in units of time), a generation block 430 for generating autocorrelation functions locally for the seismic data (e.g., based in part on the correlation window length), a performance block 440 for performing cross-correlation of the autocorrelation functions and the wave function (e.g., for a cosine function, a correlation-cosine transform) to provide cross-correlation coefficient values of the functions, a determination block 450 for determining second derivative values of the cross-correlation coefficient values (e.g., with respect to time or depth), and a render block 460 for rendering the second derivatives values.

The method 400 is shown in FIG. 4 in association with various computer-readable media (CRM) blocks 411, 421, 431, 441, 451 and 461. Such blocks generally include instructions suitable for execution by one or more processors (or cores) to instruct a computing device or system to perform one or more actions. Thus, such instructions may be referred to as executable instructions (e.g., computer-executable, processor-executable, etc.). While various blocks are shown, a single medium may be configured with instructions to allow for, at least in part, performance of various actions of the method 400.

In the example of FIG. 4, the method 400 may access seismic data (e.g., 2D, 3D, etc.) in an amplitude domain, for example, renderable as amplitude in terms of intensity, color, etc., for time or depth and position (e.g., along a line orthogonal to the time or depth dimension). In such an example, a selected frequency and cycle length for a wave function, such as a cosine function, may determine a correlation window length, for example, in seconds or depth units. The correlation window length may be applied locally to the seismic data for purposes of generating local autocorrelation functions. Given the local autocorrelation functions, a cross-correlation technique may be applied locally using the wave function to provide output in the form of values of cross-correlation coefficients with respect to time or depth and position. Such values may range, for example, from about −1 to about +1, depending on how the local autocorrelation functions cross-correlate with the wave function. Given such a matrix, an approximation for a second derivative may be applied, for example, along the time or depth dimension (e.g., a second derivative of values of cross-correlation coefficients with respect to time or depth). The resulting second derivatives may be provided in a matrix form, for example, as second derivative values versus time or depth and position. Such information may be rendered to a display and appear in a manner akin to amplitude domain information. In the foregoing example, by taking the second derivative, cross-correlation information, which may be considered as being in a "frequency domain", is effectively transformed to information akin to that of an "amplitude domain". Such a process can facilitate analysis, for example, where an analyst seeks to identify one or more features. Where the second derivative values are rendered with respect to time or depth and position, the result may be considered an "image" and the process an example of seismic image enhancement.

As an example, a method can include accessing seismic data; providing a wave function that defines, at least in part, a correlation window length; generating local autocorrelation functions for the seismic data using the correlation window length; performing cross-correlations between the wave function and each of the local autocorrelation functions to provide local cross-correlation coefficient values; determining second derivatives of the local cross-correlation coefficient values to provide local second derivative values; and rendering the local second derivative values to a display. In such an example, the accessing seismic data may include accessing seismic data as amplitude versus time or depth and a spatial dimension. As an example, a method can include rendering local second derivative values to a display as local second derivative values versus time or depth and a spatial dimension. As an example, a method can include picking one or more horizons based on rendering of local second derivative values to a display.

As an example, where a method includes providing a wave function, such a wave function may be a cosine function for a single frequency (e.g., or a sine function shifted in phase). As an example, a method may include repeating where, for each repetition of the method, the method includes providing a wave function for a different single frequency (e.g., cosine functions, each of a different frequency). As an example, a method can include rendering a graphical user interface to a display where the graphical user interface includes a graphical control for input of a frequency for a wave function.

As an example, a method can include rendering a graphical user interface to a display where the graphical user interface includes a graphical control for selection of an attribute that effectuates at least performing cross-correlations between autocorrelation functions of seismic data and a wave function (e.g., specified at a single frequency). As an example, a method may include rendering a graphical user interface to a display where the graphical user interface includes a graphical control for selection of an attribute that effectuates at least such performing cross-correlations as well as determining second derivatives of cross-correlation coefficient values.

As an example, one or more computer-readable media can include computer-executable instructions to instruct a computing system to: access seismic data from a storage device (e.g., optionally via a network); receive at least one parameter to define a wave function that determines, at least in part, a correlation window length; generate local autocorrelation functions for the seismic data using the correlation window length; perform cross-correlations between the wave function and each of the local autocorrelation functions to provide local cross-correlation coefficient values; determine second derivatives of the local cross-correlation coefficient values to provide local second derivative values; and store the local second derivative values to a storage device. In such an example, computer-executable instructions may be provided to instruct a computer system to render a graphical user interface to a display for display of a selectable attribute to instruct the computer system to execute the instructions to perform cross-correlations and to execute the instructions to determine second derivatives.

As an example, one or more computer-readable media may include computer-executable instructions to instruct a computer system to receive at least one parameter such as a frequency for a wave function, which may be a cosine function. As an example, one or more computer-readable media may include computer-executable instructions to instruct a computer system to render local second derivative values to a display. In such an example, the computer-executable instructions may provide for rendering the second derivative values to the display using a color scheme.

As an example, a system can include one or more processors; memory; a network interface; a display interface; and processor-executable instructions stored in the memory to receive seismic data via the network interface, generate local autocorrelation functions for the seismic data using a correlation window length, perform cross-correlations between a wave function and each of the local autocorrelation functions to provide local cross-correlation coefficient values, determine second derivatives of the local cross-correlation coefficient values to provide local second derivative values, and transmit signals via the display interface to render the local second derivative values to a display. In such a system, the wave function may be, for example, a cosine function. As an example, a wave function may be a wave function characterized by a single frequency.

As an example, a system may include instructions to receive or access seismic data as amplitude versus time or depth and a spatial dimension. As an example, a system may generate signals to render local second derivative values to a display, for example, where such signals provide for rendering local second derivative values versus time or depth and a spatial dimension. As an example, a system may include processor-executable instructions stored in memory to pick a horizon responsive to receipt of an input command during rendering of local second derivative values, of cross-correlation coefficient values, to a display.

Figure 5:
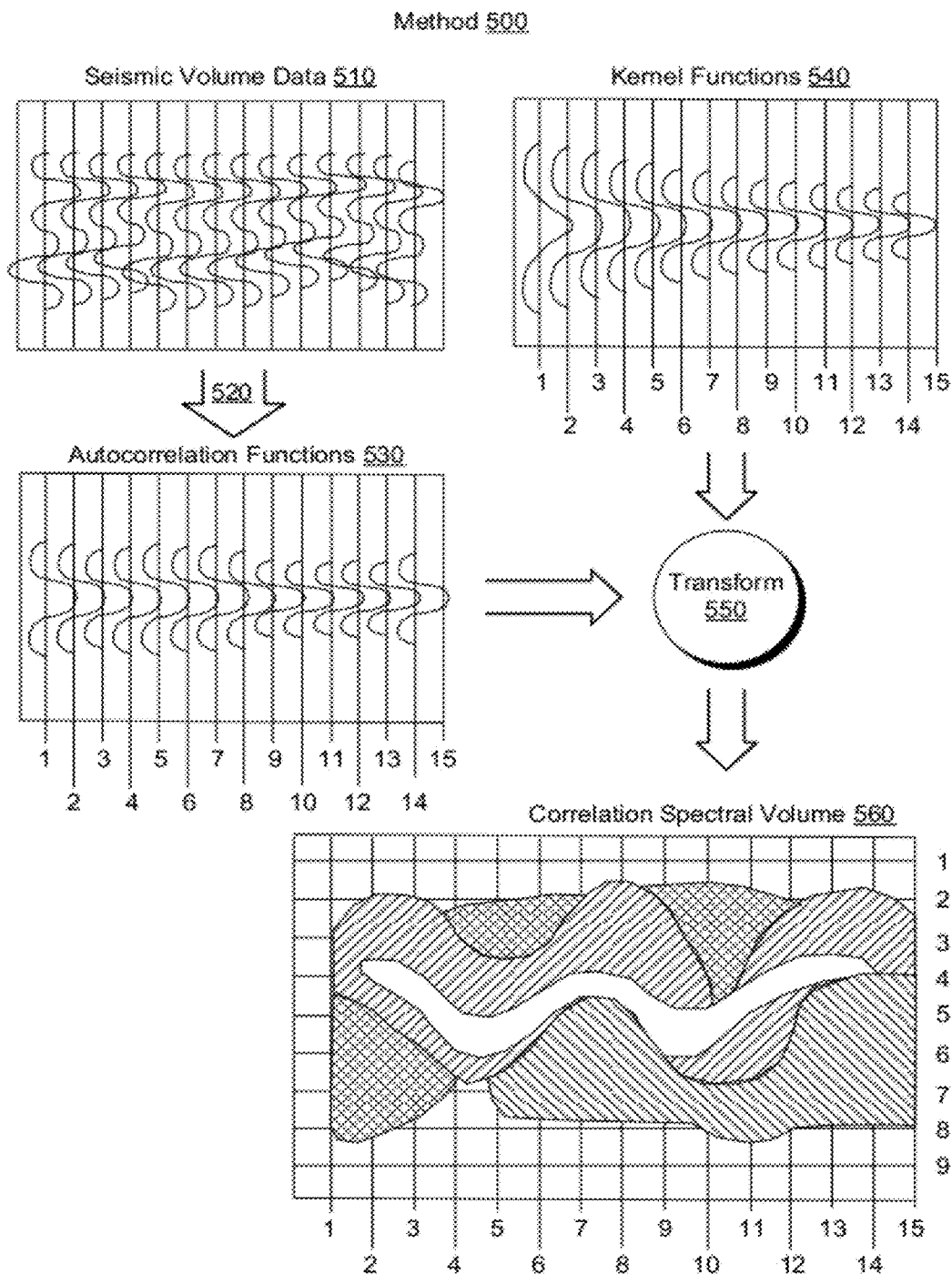
FIG. 5 illustrates an example of a transform process that provides for cross-correlation coefficient values.

FIG. 5 shows an example of a method 500. The method 500 includes a transform 550 for transforming functions. The transform 550 may provide for analyzing a resultant set of seismic data (e.g., generated in response to a seismic operation performed on a particular portion of a formation). As an example, the transform 550 may provide for determining geologic characteristics of a particular portion of a formation, which may be represented as seismic volume data 510.

In the example of FIG. 5, to analyze the seismic volume data 510 via the transform 550, one or more autocorrelation functions 530 of the seismic volume data 510 may be generated via an autocorrelation technique 520 and one or more kernel functions 540 may be provided. A kernel function may be a synthetic time series, for example, that represents a potential geologic feature of interest. A kernel function may be compared to seismic data (e.g., a trace), for example, over a time window, to determine to what extent the seismic data may be represented by the kernel function (e.g., to provide information as to a seismic signature within that time window). Where multiple kernel functions are provided, seismic data may be analyzed with respect to each of the multiple kernel function, for example, to determine which kernel function best represents aspects of the seismic data.

As an example, the transform 550 may include cross-correlating functions. For example, the transform 550 may cross-correlate one or more of the autocorrelation functions 530 and one or more of the kernel functions 540. As an output, the transform 530 may generate volume data where spatial location (e.g., geographic positions or position and time/depth) of a trace of seismic volume data 510 is preserved and another "dimension" corresponds to sequenced peak correlation values (e.g., for a cross-correlation transform) for a collection of kernel functions. In the example of FIG. 5, the output of the transform 550 is shown as a correlation spectral volume 560 (e.g., an approximate graphical representation of actual data). A correlation spectral volume can include sequenced peak correlation values (e.g., in the case of cross-correlation) for one or more kernel functions.

In FIG. 5, the seismic volume data 510 represents an initial 3D seismic volume as an input. The processing technique 520 generates one or more autocorrelation functions, for example, within a specified window, which may be output as the autocorrelation functions 530 (e.g., a preprocessing operation). While a time window is mentioned, a process may be applied, optionally in parallel, to generate an autocorrelation function for an entire trace; noting that a full trace autocorrelation function tends to be insensitive to geology and tends to be more representative of seismic wavelet.

In the example of FIG. 5, once the autocorrelation functions 530 are generated, the autocorrelation functions 530 may be transformed via the transform 550, which may apply a cross-correlation technique using one or more kernel functions. In such an example, the autocorrelation functions 530 may be deemed to include "unknown" characteristics while the kernel functions 540 may be deemed to include "known" characteristics. As an example, a possible kernel function could be derived from dominant spectral frequencies of a geologic section (e.g., 8 Hz, 35 Hz, and 65 Hz).

In the example of FIG. 5, the seismic volume data 510 may represent an input "window of interest" that includes a subset of some seismic data traces. In the example of FIG. 5, each of the seismic traces in the seismic volume data 510 may be subject to the autocorrelation technique 520. By applying the autocorrelation technique 520 to the seismic volume data 510, autocorrelation functions 530 may be produced. The one or more kernel functions 540 may include one or more "seismic trace like" functions that, for example, intend to inherently represent and correspond to one or more known geologic features of a formation. Given the autocorrelation functions 530 and the one or more kernel functions 540, in the example of FIG. 5, the transform 550 may act to compare "unknown" features of the autocorrelation functions 530 and "known" features of the one or more kernel functions 540. As mentioned, output of the transform 550 may be in the form of a correlation spectral volume 560.

In the example of FIG. 5, where multiple kernel functions are provided, each of the kernel functions 540 can undergo cross-correlation with each of the autocorrelation functions 530, via the transform 550, and, as a result, the correlation spectral volume 560 may be generated. As an example, a first kernel function of the kernel functions 540 may be cross-correlated with each of the autocorrelation functions 530 to thereby a first row of the correlation spectral volume 560.

For the seismic volume data 510 of the example of FIG. 5, a first of the kernel functions 540 is cross-correlated with each of the autocorrelation functions 530 to generate a row of the correlation spectral volume 560. Such a process continues until the last remaining one of the kernel functions 540 is cross-correlated with each of the autocorrelation functions 530 to generate the last remaining row of the correlation spectral volume 560. In such an example, if a particular cross-correlation coefficient value in the correlation spectral volume 560 is a high value, this indicates that the geologic characteristic associated with one particular kernel function substantially matches the geologic characteristic associated with one particular autocorrelation function; and, since the geologic characteristic of the one particular kernel function is a known quantity, then, the unknown geologic characteristic of the one particular autocorrelation function could be interpreted as substantially equal to the known geologic characteristic of the one particular kernel function. As a result, the "unknown" geologic characteristics of one or more of the autocorrelation functions 530 and therefore one or more of the input seismic volume data traces 510 can be determined from the "known" geologic characteristics of one or more of the kernel functions 540 by viewing the values of the cross-correlation coefficients in the correlation spectral volume 560.

The method 500 of FIG. 5 may provide a horizontal slice through the seismic volume data 510, for example, a slice orthogonal to a time or depth dimension. Such a slice may facilitate analysis, for example, to identify one or more features such as a channel in a subterranean formation. The same slice may be analyzed for two or more frequencies and the results compared. For example, a slice at 35 Hz may be compared to a slice at 65 Hz to understand frequency content in the seismic volume data 510.

In the example of FIG. 4, a method akin to the method 500 of FIG. 5 may be applied to provide an intermediate result as a slice in a plane along time or depth and position (e.g., position orthogonal to a time or depth axis). A second derivative operation may be applied to such an intermediate result to provide a final result that may facilitate picking one or more stratigraphic features.

Figure 6:
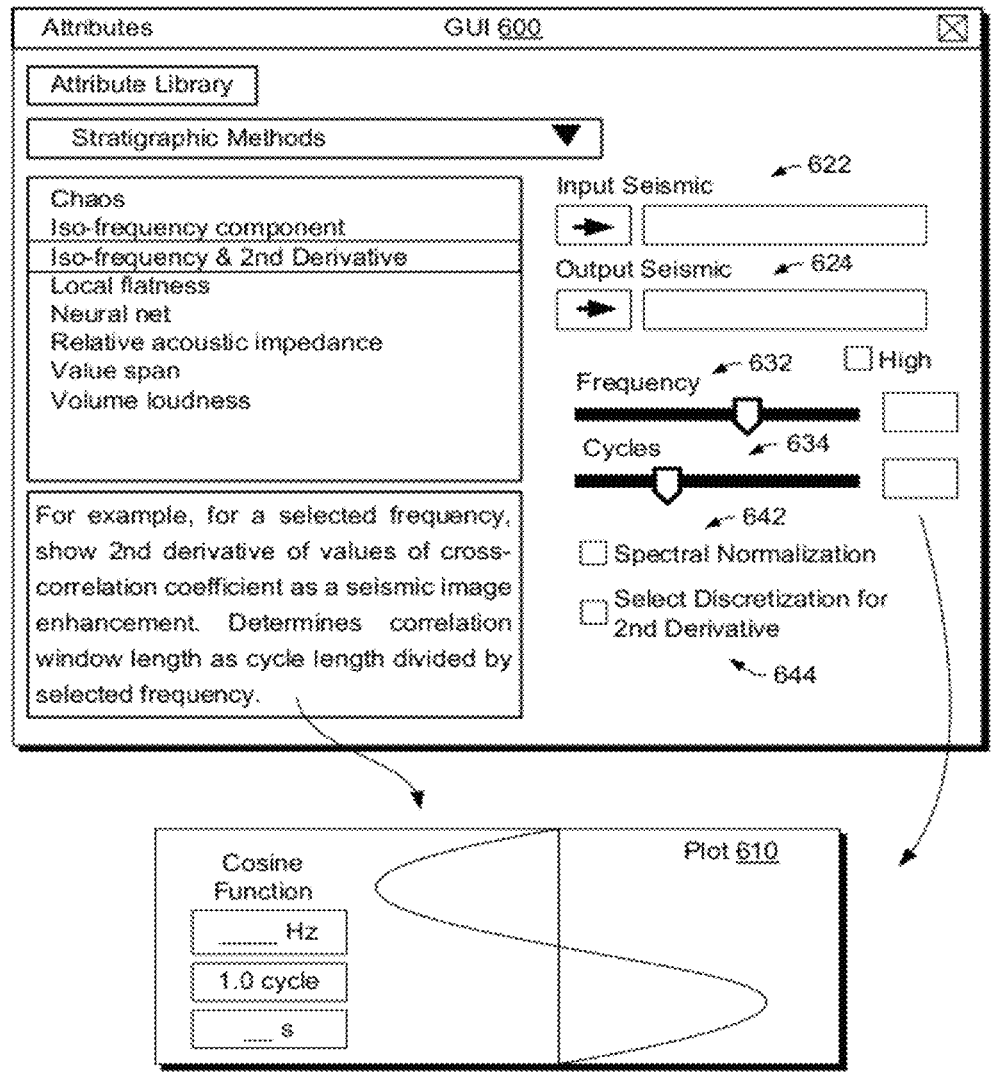
FIG. 6 illustrates an example of a graphical user interface.

FIG. 6 shows an example of a graphical user interface (GUI) 600 that includes various graphical controls, fields, etc. In the example of FIG. 6, the GUI 600 pertains to attributes, for example, of an attribute library. A graphical control of the GUI 600 allows a user to input a command to select one of a variety of attributes. For example, a user may navigate an input device to select the "Iso-frequency & 2nd Derivative" attribute. As indicated in an information field, this attribute provides, for a selected frequency, calculation of second derivatives of values of cross-correlation coefficient as a seismic image enhancement technique. As indicated, it can determine correlation window length as cycle length divided by frequency, which is illustrated in a plot 610. As to input of seismic data, a graphical control 622 allows a user to select seismic data. As to output of processed data, a graphical control 624 allows a user to optionally specify how to output processed seismic data. As to input of a frequency, a graphical control 632 allows a user to slide or type a frequency and another graphical control 634 allows a user to slide or type a cycle length. The GUI 600 may include a spectral normalization graphical control 642 and may include a graphical control 644 for selecting a discretization technique for purposes of performing a second derivative operation (e.g., according to one or more discrete approximations to a second derivative).

Figure 7:
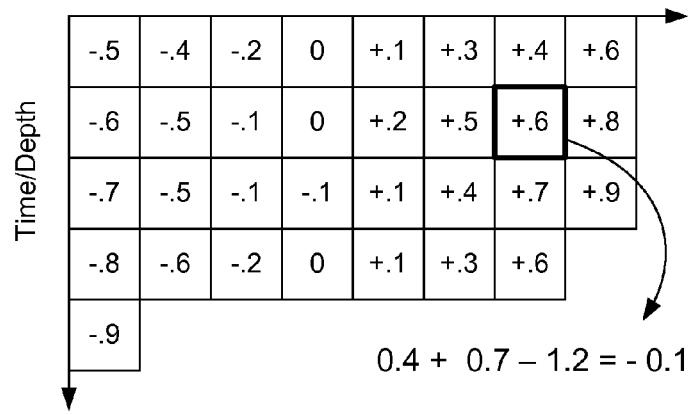
FIG. 7 illustrates examples of discretized derivatives.

FIG. 7 shows an example of a discretized first derivative 710 and an example of a discretized second derivative 720; noting that a second derivative may be effectuated by two applications of a first derivative. As to the second derivative 720, an example of a matrix that include values of cross-correlation coefficient versus time or depth and a spatial dimension. As an example, a discretized second derivative is applied to a particular entry in the matrix.

Figure 8:
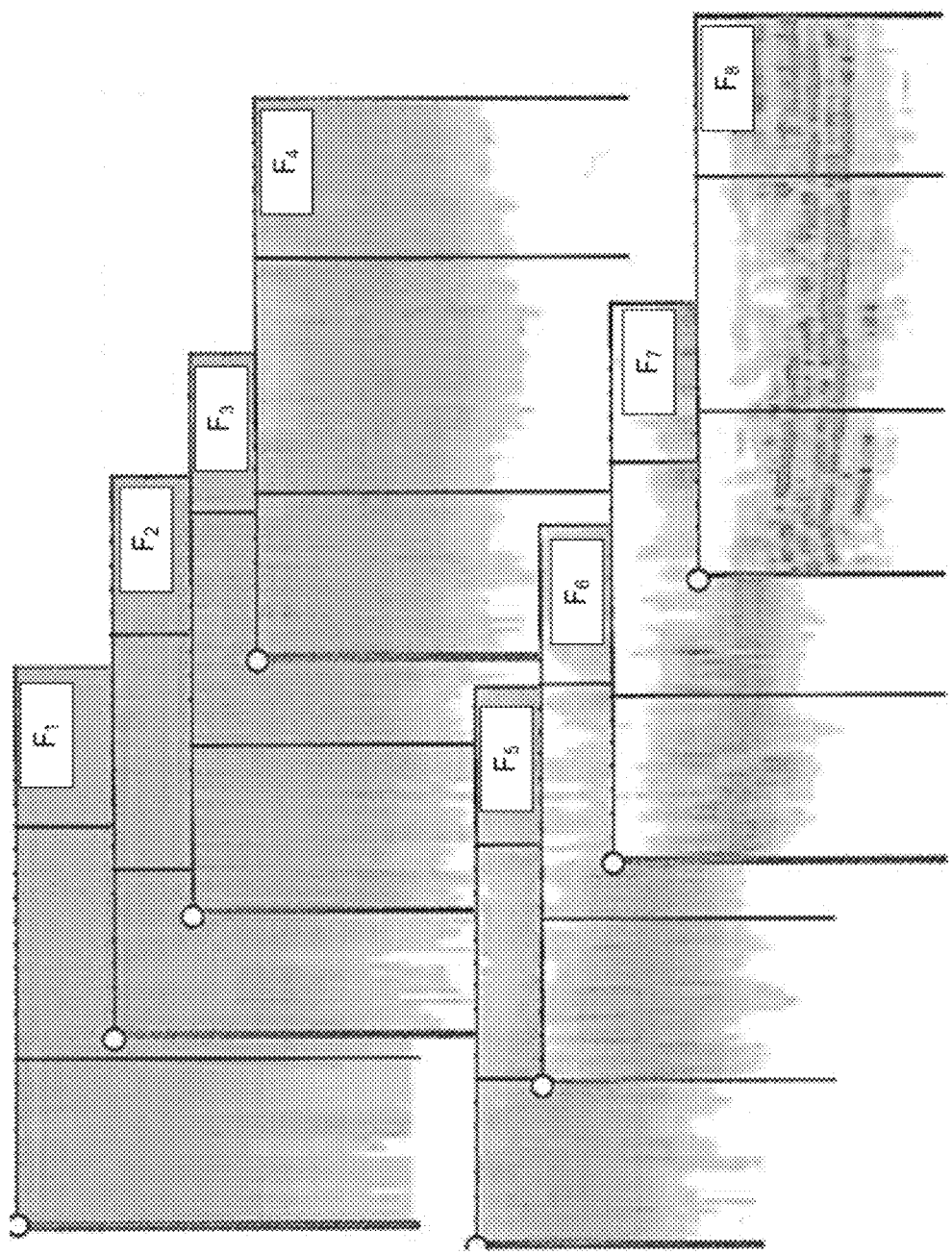
FIG. 8 illustrates examples of cross-correlation coefficient values for various different frequencies of a cosine function.

FIG. 8 shows examples of values of cross-correlation coefficient versus time or depth and a spatial dimension for various different selected frequencies $F_1$ to $F_8$ (e.g., for a cosine function), which, in turn, correspond to different correlation window lengths (e.g., which may be given in units of time). For the examples of FIG. 8, as frequency decreases from $F_1$ to $F_8$, various features become more prominent. The examples of FIG. 8 illustrate how features may be associated with a cosine function for a given frequency.

FIG. 9 shows an example plot 900 of seismic data plotted with respect to time or depth and a spatial dimension. The plot 900 is displayed in color to convey amplitude information, for example, where red is maximum amplitude and blue is minimum amplitude.

FIG. 10 shows an example plot 1000 of values of cross-correlation coefficient for seismic data and a cosine function, the values plotted with respect to time or depth and a spatial dimension. The plot 1000 is displayed in color to convey frequency/cross-correlation information, for example, where red and yellow correspond to high values of cross-correlation for the selected frequency of the cosine function (e.g., assuming a cycle length of 1).

FIG. 11 shows an example plot 1100 of second derivative values of cross-correlation coefficient for seismic data and a cosine function, the second derivative values plotted with respect to time or depth and a spatial dimension. The plot 1100 is displayed in color to convey second derivative of frequency/cross-correlation information. In FIG. 11, the plot 1100 may be considered an enhanced image of the plot 900. Such enhancement may be achieved by, for example, selecting the "Iso-frequency & 2nd derivative" attribute in the GUI 600, performing the method 400 of FIG. 4, or one or more other manners (e.g., where cross-correlation and second derivative operations are applied).

Figure 12:
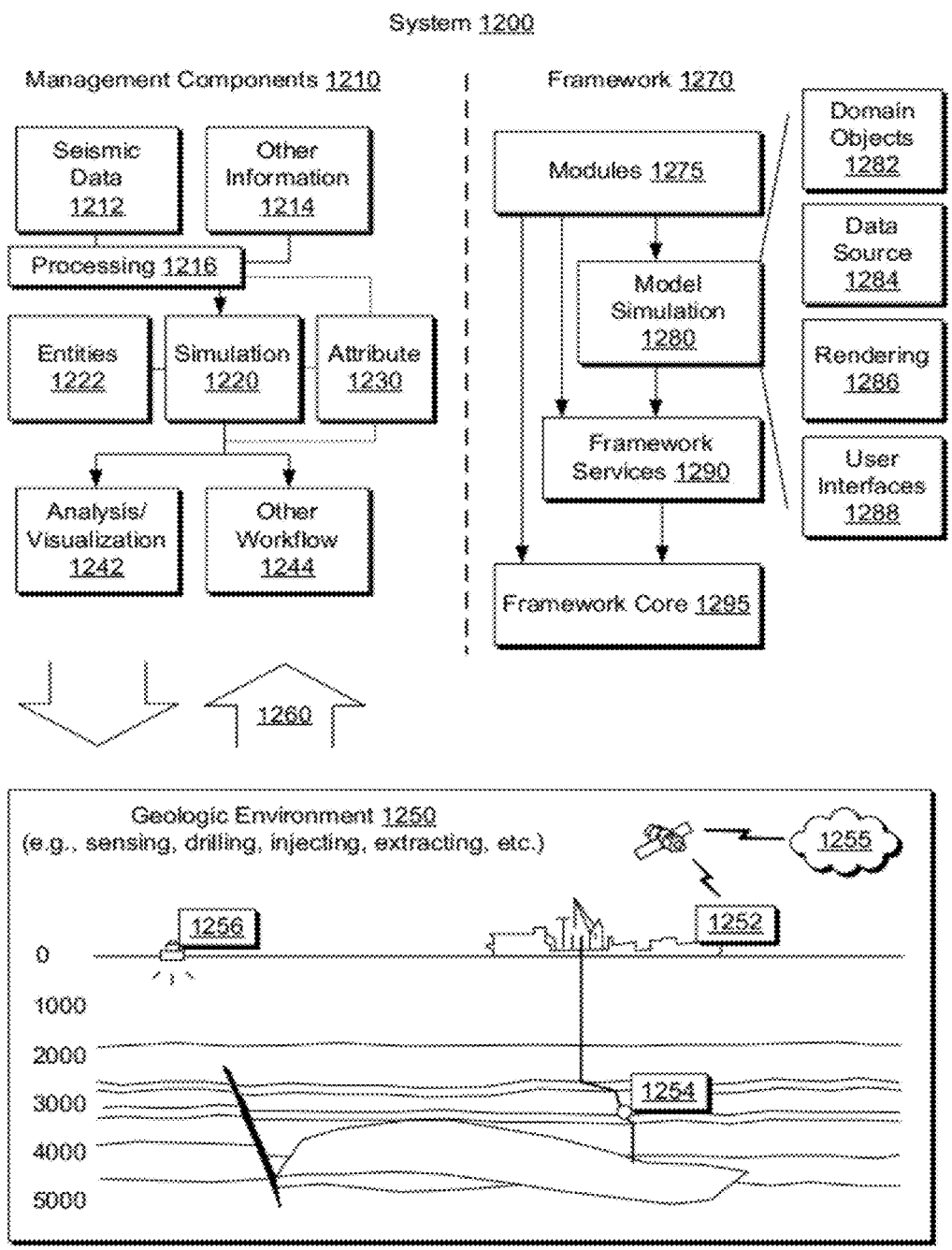
FIG. 12 illustrates an example of a system.

FIG. 12 shows an example of a system 1200 that includes various management components 1210 to manage various aspects of a geologic environment 1250 (e.g., an environment that includes a sedimentary basin). For example, the management components 1210 may allow for direct or indirect management of sensing, drilling, injecting, extracting, etc., with respect to the geologic environment 1250. In turn, further information about the geologic environment 1250 may become available as feedback 1260 (e.g., optionally as input to one or more of the management components 1210).

In the example of FIG. 12, the management components 1210 include a seismic data component 1212, an additional information component 1214 (e.g., well/logging data), a processing component 1216, a simulation component 1220, an attribute component 1230, an analysis/visualization component 1242 and a workflow component 1244. In operation, seismic data and other information provided per the components 1212 and 1214 may be input to the simulation component 1220.

In an example embodiment, the simulation component 1220 may rely on entities 1222. Entities 1222 may include earth entities or geological objects such as wells, surfaces, reservoirs, etc. In the system 1200, the entities 1222 can include virtual representations of actual physical entities that are reconstructed for purposes of simulation. The entities 1222 may include entities based on data acquired via sensing, observation, etc. (e.g., the seismic data 1212 and other information 1214).

In an example embodiment, the simulation component 1220 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 12, the simulation component 1220 may process information to conform to one or more attributes specified by the attribute component 1230, which may include a library of attributes (see, e.g., attributes of the example of FIG. 6). Such processing may occur prior to input to the simulation component 1220. Alternatively, or in addition, the simulation component 1220 may perform operations on input information based on one or more attributes specified by the attribute component 1230. In an example embodiment, the simulation component 1220 may construct one or more models of the geologic environment 1250, which may be relied on to simulate behavior of the geologic environment 1250 (e.g., responsive to one or more acts, whether natural or artificial). In the example of FIG. 12, the analysis/visualization component 1242 may allow for interaction with a model or model-based results. Additionally, or alternatively, output from the simulation component 1220 may be input to one or more other workflows, as indicated by a workflow component 1244.

In an example embodiment, the management components 1210 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 1210 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 12 also shows an example of a framework 1270 that includes a model simulation layer 1280 along with a framework services layer 1290, a framework core layer 1295 and a modules layer 1275. The framework 1270 may include the commercially available OCEAN® framework where the model simulation layer 1280 is the commercially available PETREL® model-centric software package that hosts OCEAN® framework applications. In an example embodiment, the PETREL® software may be considered a data-driven application. The PETREL® software can include a framework for model building and visualization.

The model simulation layer 1280 may provide domain objects 1282, act as a data source 1284, provide for rendering 1286 and provide for various user interfaces 1288. Rendering 1286 may provide a graphical environment in which applications can display their data while the user interfaces 1288 may provide a common look and feel for application user interface components.

In the example of FIG. 12, the domain objects 1282 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 12, data may be stored in one or more data sources (or data stores, generally physical data storage devices), which may be at the same or different physical sites and accessible via one or more networks. The model simulation layer 1280 may be configured to model projects. As such, a particular project may be stored where stored project information may include inputs, models, results and cases. Thus, upon completion of a modeling session, a user may store a project. At a later time, the project can be accessed and restored using the model simulation layer 1280, which can recreate instances of the relevant domain objects.

In the example of FIG. 12, the geologic environment 1250 may be outfitted with any of a variety of sensors, detectors, actuators, etc. For example, equipment 1252 may include communication circuitry to receive and to transmit information with respect to one or more networks 1255. Such information may include information associated with downhole equipment 1254, which may be equipment to acquire information, to assist with resource recovery, etc. Other equipment 1256 may be located remote from a well site and include sensing, detecting, emitting or other circuitry. Such equipment may include storage and communication circuitry to store and to communicate data, instructions, etc.

As an example, various aspects of the management components 1210 may be implemented as add-ons or plug-ins that operate according to specifications of a framework environment. For example, a commercially available framework environment marketed as the OCEAN® framework environment (Schlumberger Limited) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. As described herein, various components may be implemented as add-ons (or plug-ins) that conform to and operate according to specifications of a framework environment (e.g., according to application programming interface (API) specifications, etc.). Various technologies described herein may be optionally implemented as components in an attribute library (see, e.g., the attribute component 1230).

In the field of seismic analysis, aspects of a geologic environment may be defined as attributes. As an example, seismic attributes can help to condition amplitude seismic data for improved structural interpretation tasks, such as determining the exact location of lithological terminations and helping isolate hidden seismic stratigraphic features of a geologic environment. Attribute analysis can be quite helpful to defining a trap in exploration or delineating and characterizing a reservoir at the appraisal and development phase. An attribute generation process (e.g., in the PETREL® framework or other framework) may rely on a library of various seismic attributes (e.g., for display and use with seismic interpretation and reservoir characterization workflows). As an example, generation of attributes may occur on the fly for rapid analysis while, as another example, attribute generation may occur as a background process (e.g., a lower priority thread in a multithreaded computing environment), which can allow for one or more foreground processes (e.g., to enable a user to continue using various components).

Attributes can help extract value from seismic and other data, for example, by providing more detail on subtle lithological variations of a geologic environment (e.g., an environment that includes one or more reservoirs).

As described herein, one or more computer-readable media may include computer-executable instructions to instruct a computing system to output information for controlling a process. For example, such instructions may provide for output to sensing process, an injection process, drilling process, an extraction process, etc.

Figure 13:
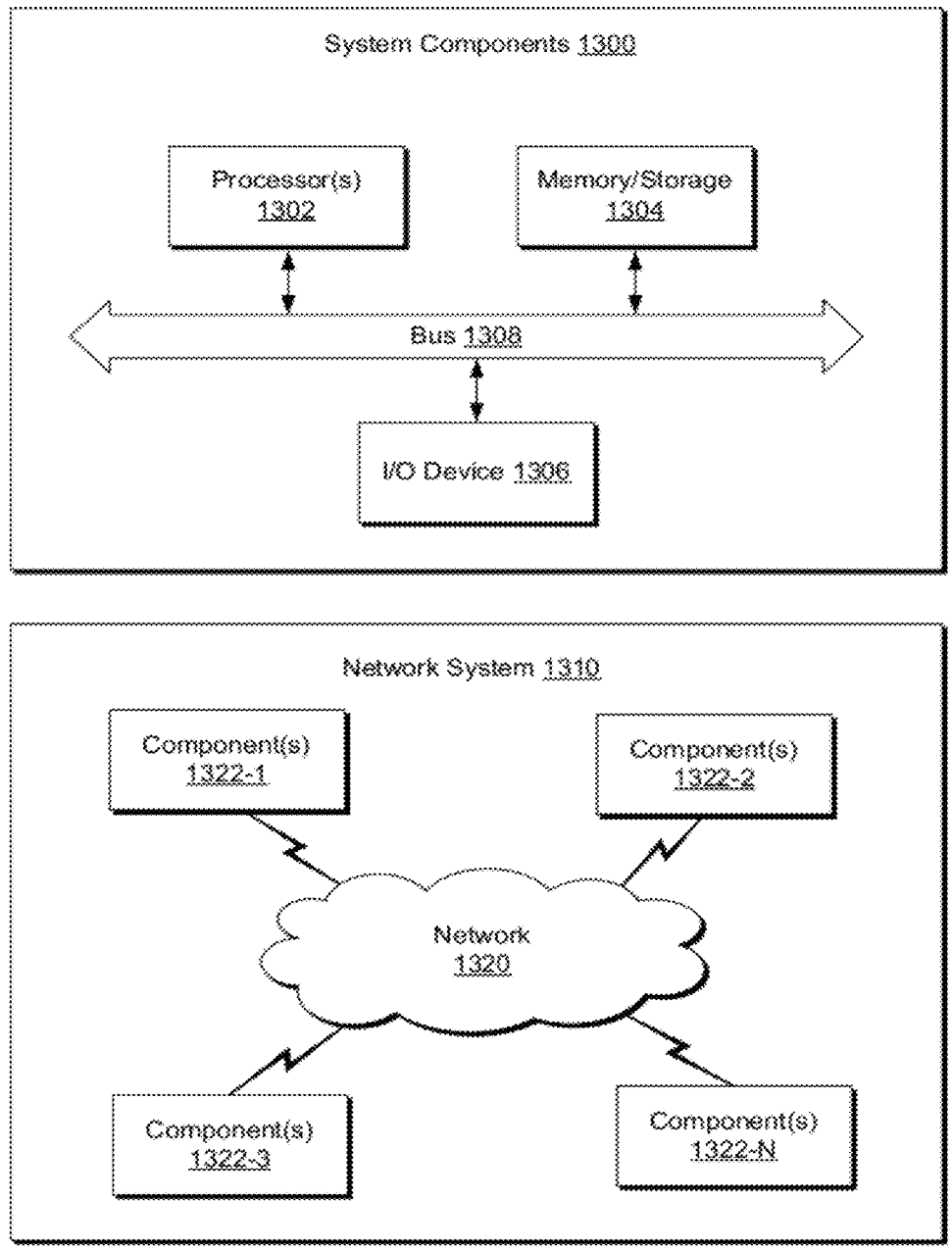
FIG. 13 illustrates an example of system components and an example of a network system.

FIG. 13 shows components of an example of a computing system 1300 and an example of a networked system 1310. The system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc.

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1302-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

The invention claimed is:

1. A method comprising:
accessing seismic data; and
enhancing the seismic data for identification of at least one horizon of a geologic environment by
providing a wave function that defines, at least in part, a correlation window length;
generating local autocorrelation functions for the seismic data using the correlation window length;
performing cross-correlations between the wave function and each of the local autocorrelation functions to provide local cross-correlation coefficient values;
determining second derivatives of the local cross-correlation coefficient values to provide local second derivative values; and
rendering the local second derivative values to a display.

2. The method of claim 1 wherein the accessing seismic data comprises accessing seismic data as amplitude versus time or depth and a spatial dimension.

3. The method of claim 1 wherein the rendering the local second derivative values to a display comprises rendering the local second derivative values versus time or depth and a spatial dimension.

4. The method of claim 1 further comprising identifying at least one horizon based on the rendering of the local second derivative values to the display.

5. The method of claim 1 wherein the providing a wave function comprises providing a cosine function for a single frequency.

6. The method of claim 5 further comprising repeating the method wherein the providing a cosine function for a single frequency comprises, for each repetition of the method, providing a cosine function for a different single frequency.

7. The method of claim 1 further comprising rendering a graphical user interface to the display wherein the graphical user interface comprises a graphical control for input of a frequency for the wave function.

8. The method of claim 1 further comprising rendering a graphical user interface to the display wherein the graphical user interface comprises a graphical control for selection of an attribute that effectuates at least the performing cross-correlations.

9. The method of claim 1 further comprising rendering a graphical user interface to the display wherein the graphical user interface comprises a graphical control for selection of an attribute that effectuates at least the performing cross-correlations and the determining second derivatives.

10. One or more non-transitory computer-readable media comprising computer-executable instructions to instruct a computing system to:
access seismic data from a storage device and, to enhance the seismic data for identification of at least one horizon of a geologic environment,
receive at least one parameter to define a wave function that determines, at least in part, a correlation window length;
generate local autocorrelation functions for the seismic data using the correlation window length;
perform cross-correlations between the wave function and each of the local autocorrelation functions to provide local cross-correlation coefficient values;
determine second derivatives of the local cross-correlation coefficient values to provide local second derivative values; and
store the local second derivative values to a storage device.

11. The one or more non-transitory computer-readable media of claim 10 further comprising computer-executable instructions to instruct a computer system to render a graphical user interface to a display for display of a selectable attribute to instruct the computer system to execute the instructions to perform cross-correlations and to execute the instructions to determine second derivatives.

12. The one or more non-transitory computer-readable media of claim 10 wherein the computer-executable instructions to instruct a computer system to receive at least one parameter comprises instructions to receive a frequency for the wave function.

13. The one or more non-transitory computer-readable media of claim 10 further comprising computer-executable instructions to instruct a computer system to render the local second derivative values to a display.

14. The one or more non-transitory computer-readable media of claim 13 wherein the computer-executable instructions to instruct a computer system to render the local second derivative values to a display comprise computer-executable instructions to render the second derivative values to the display using a color scheme.

15. A system comprising:
one or more processors;
memory;
a network interface;
a display interface; and
processor-executable instructions stored in the memory to receive seismic data via the network interface and, to enhance the seismic data for identification of at least one horizon of a geologic environment,
generate local autocorrelation functions for the seismic data using a correlation window length,
perform cross-correlations between a wave function and each of the local autocorrelation functions to provide local cross-correlation coefficient values,
determine second derivatives of the local cross-correlation coefficient values to provide local second derivative values, and
transmit signals via the display interface to render the local second derivative values to a display.

16. The system of claim 15 wherein the wave function comprises a cosine function.

17. The system of claim 15 wherein the wave function comprises a wave function characterized by a single frequency.

18. The system of claim 15 wherein the seismic data comprises seismic data as amplitude versus time or depth and a spatial dimension.

19. The system of claim 15 wherein the signals to render the local second derivative values to a display comprises signals to render the local second derivative values versus time or depth and a spatial dimension.

20. The system of claim 15 further comprising processor-executable instructions stored in the memory to pick a horizon responsive to receipt of an input command during rendering of the local second derivative values to a display.

* * * * *